United States Patent [19]

Bassoli et al.

[11] 4,294,210
[45] Oct. 13, 1981

[54] DISTRIBUTOR-TYPE INJECTOR PUMP, FOR MULTI-CYLINDER COMPRESSION-IGNITION INTERNAL COMBUSTION ENGINES

[75] Inventors: Cesare Bassoli; Giorgio Cornetti; Francesco Lovisolo, all of Turin, Italy

[73] Assignee: Centro Ricerche Fiat S.p.A., Orbassano, Italy

[21] Appl. No.: 9,619

[22] Filed: Feb. 6, 1979

[30] Foreign Application Priority Data

Feb. 15, 1978 [IT] Italy ............................... 67315 A/78

[51] Int. Cl.³ ............................................. F02M 45/02
[52] U.S. Cl. ............................ 123/300; 123/449; 123/503
[58] Field of Search ..... 123/132 G, 139 AP, 139 AL, 123/139 AQ, 449, 501, 503, 299, 300

[56] References Cited

U.S. PATENT DOCUMENTS

| | | | |
|---|---|---|---|
| 2,910,976 | 11/1959 | Fancher | 123/139 AP X |
| 2,974,657 | 3/1961 | Bessier | 123/32 G |
| 3,370,539 | 2/1968 | Eyzat | 123/32 G X |
| 3,392,715 | 7/1968 | Thoma | 123/32 G X |
| 3,439,655 | 4/1969 | Eyzat | 123/32 G |
| 3,690,768 | 9/1972 | Nagasawa | 123/32 G |
| 3,792,692 | 2/1974 | Kiley | 123/32 G |
| 3,827,419 | 8/1974 | Isgmura | 123/32 G |
| 4,168,940 | 9/1979 | Konrath | 123/139 AQ |

FOREIGN PATENT DOCUMENTS 2131195 12/1971 Fed. Rep. of Germany ... 123/32 G

Primary Examiner—Stuart S. Levy
Attorney, Agent, or Firm—Sughrue, Mion, Zinn, Macpeak & Seas

[57] ABSTRACT

A distributor-type fuel injector pump for an internal combustion engine has a rotary distributor member formed with two outlet passages communicating with a pump chamber and arranged to distribute fuel intermittently to successive fuel delivery apertures leading to respective engine cylinders, so that in each revolution of the distributor the pump delivers to each cylinder a principal fuel injection at the end of the compression stroke, preceded by a pre-injection. Automatic timing control means advance the delivery stroke of the pump automatically in response to engine speed increase, and the angle between the outlets of the two outlet passages is such that as the engine speed varies the ratio of the fuel pre-injected to that of the principal injection into each cylinder varies according to a rule predetermined in relation to the type of engine (i.e. precombustion chamber or direct injection type).

1 Claim, 12 Drawing Figures

DISTRIBUTOR-TYPE INJECTOR PUMP, FOR MULTI-CYLINDER COMPRESSION-IGNITION INTERNAL COMBUSTION ENGINES

DESCRIPTION

The present invention relates to distributor-type injector pumps for multi-cylinder compression-ignition internal combustion engines.

In particular, the invention concerns injector pumps of the type comprising: a pump body having an internal cylindrical cavity and a compression chamber; means for the introduction of fuel into the said compression chamber; piston means slidable within the body for compressing fuel in the said compression chamber; a number of delivery apertures in the wall of the cylindrical cavity of the body for communication with each of the cylinders of the engine; a rotary distributor member located in the said cylindrical cavity; two distinct fuel passage means, formed in said rotary distributor member and each having an inlet end permanently communicating with the compression chamber and an outlet end in the external surface of the distributor member, the outlet ends of the said passage means being situated in two areas angularly separated from each other such that they come intermittently into communication, upon rotation of the distributor member, with the successive said delivery apertures to effect, in correspondence with each fuel delivery stroke of the said piston means, two injections of fuel into two different cylinders of the engine, so that the pump delivers into each cylinder of the engine in each cycle thereof a principal injection of fuel substantially at the end of the compression stroke, preceded by a preinjection of fuel, and means sensitive to the engine rotational speed for controlling the timing of the injection and adapted to advance the start of the delivery stroke of the piston means upon increase in the engine rotational speed.

As is already known, the purpose of the preinjection is to reduce the delay in the ignition of the fuel introduced by means of the principal injection. Such reduction in the said delay makes it possible to eliminate some difficulties characteristic of compression-ignition internal combustion engines: in the first place, the combustion noise is considerably reduced, and in the second place the reduction in the ignition delay makes it possible to reduce the quantity of atmospheric pollutants (nitrogen oxide, carbon particles and carcinogenic compounds absorbed by the latter) present in the engine exhaust gases.

For satisfactory preinjection it is necessary that the quantity of fuel introduced by preinjection should be sufficient to cause inside the respective cylinder of the engine an increase in temperature, due to the development of pre-burning reactions, such as to reduce the said ignition delay. If, however, this quantity of preinjected fuel exceeds a fixed limit value, this would cause complete and untimely oxidation of the preinjected fuel with consequent strong pressure fluctuations within the cylinder and a reduction in the utilizable thermal efficiency.

Furthermore, in determining of the quantity of fuel to be introduced by preinjection into each cylinder, account must be taken of the effect of the preinjection on the fuel consumption and on the quantity of unburned hydrocarbons present in the engine exhaust gases.

Finally, the characteristics of the preinjection must be adapted to the particular type of engine to be fed by the injection pump. In particular, the injection characteristics for an engine of the precombustion chamber would be different from those for an engine of the direct injection type: for an engine of the precombustion type injection occurs in the hot environment of the precombustion chamber, while for an engine of the direct injection type it is necessary to avoid the jet of injected fuel impinging directly on the cold walls of the cylinder, since this would impede complete combustion.

An injector pump of the type previously referred to is disclosed in French Pat. No. 1,218,469. By means of the pump described in this patent it is possible to effect preinjection by relatively simple means, but the solution proposed in this patent does not solve the problem of controlling the quantity of fuel preinjected in relation to the rotational speed of the engine, and limiting the preinjection to engine operation speeds at which it is advantageous and at which any disadvantages as regards, for example, fuel consumption or unburned hydrocarbons in the engine exhaust, are non-existent or negligible. Furthermore, this patent does not include any instruction for the adaptation of the preinjection to the different needs of different types of engine.

Another known type of injector pump of the aforesaid type is disclosed in the following German Patent Applications published prior to examination: DOS 1476215, DOS 1476216 and DOS 1476217. The injector pumps described in these patent applications are equipped with means for controlling in dependence upon the engine load and the type of engine the quantity of fuel preinjected relative to the quantity of fuel introduced with the principal injection.

However, such control of the preinjection is independent of the rotational speed of the engine, so that it is not possible to limit the preinjection only to those engine speeds at which the preinjection is actually effective.

The object of the present invention is to provide an injector pump of the type previously defined by means of which it is possible to control, with extremely simple means which may be readily adapted to the type of engine intended to be fed by the pump, the quantity of fuel preinjected in such a way as to ensure the effectiveness of the preinjection as regards reduction of ignition delay, while substantially avoiding the attendant disadvantages such as increased fuel consumption and unburned hydrocarbons in the engine exhaust gases.

With this object in view, the present invention provides an injector pump of the distributor type previously referred to, characterised in that the angle ($\alpha$) between the outlet ends of the said two fuel passage means is so determined that, as the engine rotational speed varies, the said means controlling the injection timing causes a variation, according to a predetermined rule dependent on the characteristics of the engine to be fed by the pump, in the ratio of the quantity of fuel preinjected into each cylinder in each engine cycle to the quantity of fuel injected in the principal injection.

When the engine to be fed by the injector pump of the present invention is of the precombustion chamber type, the said angle is selected such that the quantity of fuel preinjected into each cylinder in each cycle decreases as the speed of rotation of the engine increases, in such a way that the said ratio becomes null for values of the engine rotational speed exceeding a threshold value substantially equal to half the maximum speed of rotation of the engine.

When the engine to be fed by the injector pump is of the direct injection type, the said angle is selected in such a way that the quantity of fuel preinjected into each cylinder in each cycle decreases as the speed of rotation of the engine decreases in such a way that the said ratio becomes null for values of the engine rotational speed less than a threshold value substantially equal to half the maximum speed of rotation of the engine.

The injector pump according to the invention will now be described, by way of non-limiting example, with reference to the accompanying drawings, in which.

Figure 1:
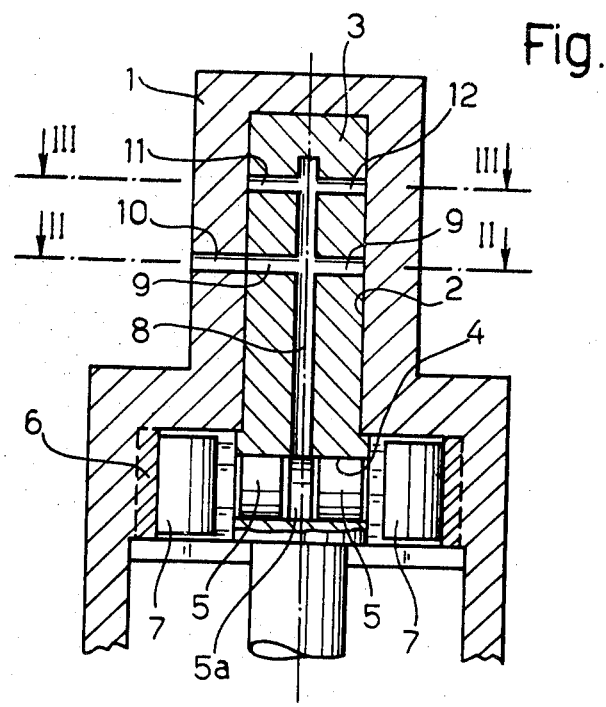
FIG. 1 is a diagrammatic longitudinal section of an injector pump according to a first embodiment of the invention.

The pump illustrated in FIG. 1 is intended to deliver fuel to a four-cylinder compression-ignition engine and comprises a fixed body 1 having a cylindrical bore 2 within which a cylindrical distributor member 3 is rotatably housed. The distributor member 3 is rotatably driven by means of a mechanical transmission, not shown, from the engine to which the injector pump supplies fuel. The distributor member 3 has a transverse cylindrical bore 4 in which two opposing pistons 5 slide.

A cam ring 6 co-axial with the distributor member 3 has an internal cam surface engaged by two cam-follower rollers 7 carried by the distributor member 3 and connected to the respective pistons 5. Upon rotation of the distributor member 3 the cam ring 6 causes reciprocating movement of the pistons 5 in the bore 4. A compression chamber 5a is delimited within the bore 4 between the facing surfaces of the pistons 5.

The distributor member 3 is provided with an axial duct 8 which communicates at one end with the compression chamber 5a, and which also communicates with four radial ducts 9 in the distributor member 3, angularly equidistant from each other. Upon rotation of the distributor member 3 the ducts 9 are brought successively into momentary communication with a duct 10 formed in the body 1 of the pump and through which fuel is fed to the pump.

Figure 3:
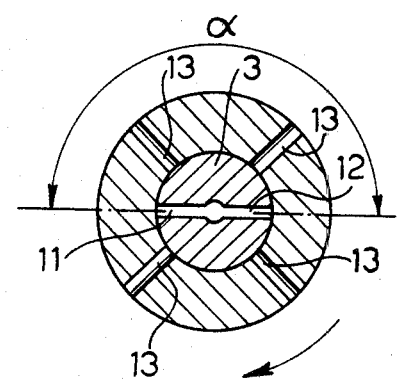
FIG. 3 is a cross-section taken on line III-III of FIG. 1.

The distributor member 3 is also provided with two radial ducts 11, 12 communicating at their radially inner ends with the axial duct 8 and having their radially outer ends situated in two zones of the external surface of the distributor member 3 separated angularly from each other by an angle α (FIG. 3). Upon rotation of the distributor member 3 the ducts 11, 12 are placed successively into momentary communication with four delivery ports 13 formed in the cylindrical wall of the bore 2 and each connected with a respective one of the cylinders of the engine, so as to effect into each cylinder of the engine a principal injection and a preinjection of fuel respectively in each cycle of the engine.

The said mechanical transmission by means of which the engine imparts rotary drive to the distributor member 3 is such that the said member 3 makes one complete revolution for every two revolutions of the engine crankshaft.

Figure 5:
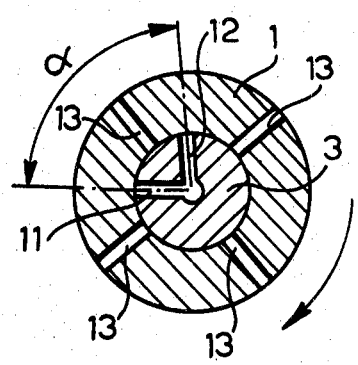
FIG. 5 is a cross-section corresponding to FIG. 3 of a variant of the first embodiment.

The value of the angle α is close to 180°, as illustrated in FIGS. 1 and 3, or is close to 90°, as illustrated in FIG. 5, according to whether the engine to be fed is of the direct injection type or of the precombustion chamber type respectively.

Where the engine to be fed by the injector pump is of the direct injection type, it is necessary to effect the preinjection into each cylinder substantially at the end of the exhaust stroke, when the piston is close to top dead-centre and prevents the preinjected fuel from making contact with the relatively cold walls of the cylinder.

Where, on the other hand, the engine is of the precombustion chamber type it is preferable to effect the preinjection into each cylinder substantially at the beginning of the compression stroke.

The injector pump according to the invention is provided with means, known per se, (not shown) sensitive to the speed of rotation of the engine and adapted to advance the beginning of the active phase in which fuel supplied to the pump through the duct 10 is compressed by the pistons 5. Such engine speed responsive means act on the ring 6, causing it to rotate with respect to the body 1 of the pump so as to vary the angular position of the distributor member 3 in each revolution thereof at which the pistons 5 are moved towards each other.

Figure 2:
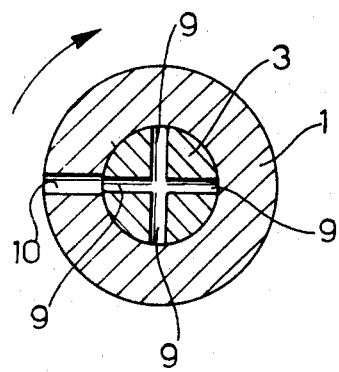
FIG. 2 is a cross-section taken on line II-II of FIG. 1.

The operation of the pump illustrated in FIGS. 1 to 3 is as follows: for a given rotational speed of rotation of the engine, and therefore for a given speed of rotation of the distributor member 3, the fuel is fed through the ducts 10, 9 and 8 to the compression chamber 5a. When the ducts 9 cease to communicate with the duct 10 in the body of the pump the pistons 5 approach each other and force fuel under pressure through the ducts 8, 11 and 12 through diametrically opposed ports 13 into two different cylinders of the engine in order to effect the principal injection and the preinjection respectively.

Upon variation of the rotational speed of the engine the operation of the pump differs according to whether the engine is of the direct injection type or of the precombustion chamber type.

Figure 4:
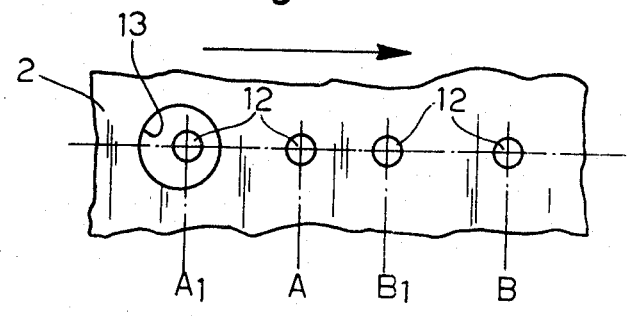
FIG. 4 illustrates diagrammatically a detail of the pump of FIG. 1 in one specific working condition.

For a direct injection type of engine FIG. 4 illustrates, in developed plan, the relative angular positions of one of the delivery ports 13 and the outlet end of the duct 12 at the start and at the end of the fuel delivery stroke of the pistons 5, for different rotational speeds of the engine. The direction of the relative movement of the outlet end of the duct 12 with respect to the delivery port 13 due to the rotation of the distributor member 3 is indicated by an arrow in FIG. 4.

If the engine is running at idling speed, the outlet end of the duct 12 is located, at the beginning and at the end of the fuel delivery stroke of the pistons 5, in the positions indicated by A and B respectively. In these conditions, then, preinjection is not effected, since the duct 12 does not communicate with the port 13 during the fuel delivery stroke of the pistons 5.

When the rotational speed of the engine increases the ring 6 rotates so as to advance the delivery stroke of the pistons 5. At a certain speed of rotation of the distributor member 3 the outlet end of the duct 12 is located, for example, in the positions indicated respectively by $A_1$ and $B_1$ at the beginning and at the end respectively of the delivery stroke of the pistons 5. Under these conditions the duct 12 and the port 13 are in communication with each other at the commencement of the delivery stroke so as to allow preinjection to be effected into the cylinder which is in communication with the said port 13.

The said angle $\alpha$ is so selected that the preinjection is effected only when the engine rotational speed is greater than a threshold value substantially equal to half the maximum speed of rotation of the engine.

Figure 6:
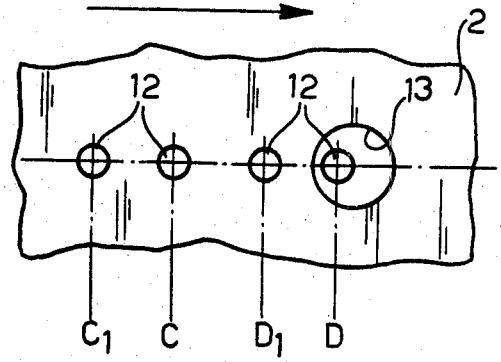
FIG. 6 is a diagrammatic illustration corresponding to FIG. 4 of a variant of the first embodiment.

FIG. 6 is a developed plan view corresponding to FIG. 4 for the variant shown in FIG. 5 for use with an engine of the precombustion chamber type. In this case, if the engine is at idling speed, the outlet end of the duct 12 is located in the positions indicated by C and D at the beginning and at the end respectively of the delivery stroke of the pistons 5. Under these conditions preinjection is effected since the duct 12 and the port 13 are in inter-communication before the end of the said delivery stroke.

Upon increase in the engine rotational speed rotation, the ring 6 rotates so that at a certain engine speed the outlet end of the duct 12 is located, for example, in the positions indicated respectively by $C_1$ and $D_1$ at the beginning and end respectively of the delivery stroke of the pistons 5. Under these conditions preinjection is no longer effected since at the end of the delivery stroke of the pistons 5 the duct 12 and the port 13 are out of communication with each other.

In this case the angle $\alpha$ is such that the preinjection is effected only when the speed of rotation of the engine is less than a threshold value which is substantially half the maximum speed of the engine.

The required control of the fuel preinjection upon variation in the engine rotational speed in the case of a direct injection engine is different from the preinjection control required for a precombustion chamber engine, due to the different combustion characteristics of these two types of engine.

It will be evident from the preceding description that the selection of the optimum value of the angle $\alpha$ for operating the invention depends on the geometry of the distributor and in particular on the diameter of the distributor member 3, the diameter of the outlet end of the duct 12 and on the diameter of the delivery port 13.

Tests carried out on an injector pump of the type illustrated in FIG. 1 based on the CAV (Trade Mark) pump type DPA, having a distributor member 3 of 18 mm diameter, delivery ports 13 of 2.3 mm diameter, and a duct 12 of 0.5 mm diameter have indicated the following optimum values of the angle $\alpha$ for the two different types of engine, having, in each case, four cylinders and a total cylinder capacity of 2500 cm³:

Precombustion chamber engine: $\alpha = 84°$
Direct injection engine: $\alpha = 186°$ It will be understood that although the pump illustrated is intended to supply fuel to a four-cylinder engine, it may readily be modified to feed an engine with any number of cylinders.

Figure 7:
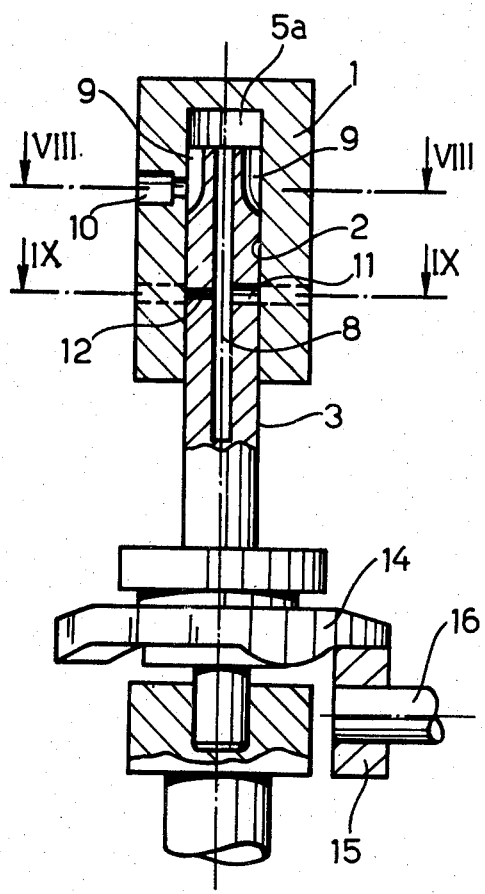
FIG. 7 is a longitudinal sectional view of an injector pump according to a second embodiment of the invention.

In the second illustrated embodiment of the pump, illustrated in FIG. 7, which is also intended to supply fuel to a four-cylinder engine, components which correspond to those of the pump of FIG. 1 are indicated with the same reference numerals.

In the pump illustrated in FIG. 7 the pump has a rotary distributor member 3 which is slidable axially inside the cylindrical bore 2 in the pump body 1. The distributor member 3, as in the embodiment of FIG. 1 is rotatably driven by transmission means by the engine in which the pump is mounted.

The axial displacement of the distributor member 3 is controlled by a cam 14 fixed onto one end of the distributor member 3. The cam 14 has an axially facing cam surface engaged by a roller 15 supported rotatably on a shaft 16 mounted upon a ring, not shown, co-axial with the rotary distributor member 3. This pump is provided with known means, not shown, responsive to the speed of the engine, for advancing the beginning of the fuel delivery stroke of the pump. These means act on the ring which supports the roller shaft 16, rotating this ring with respect to the body 1 so as to vary the angular position in each revolution of the distributor member 3 at which the said member 3 is displaced axially upwardly, as shown in FIG. 7.

Figure 9:
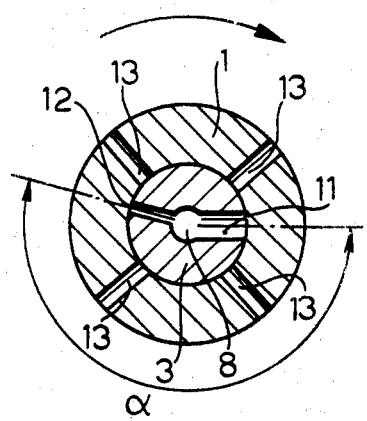
FIG. 9 is a cross-section taken on line IX—IX of FIG. 7.
Figure 11:
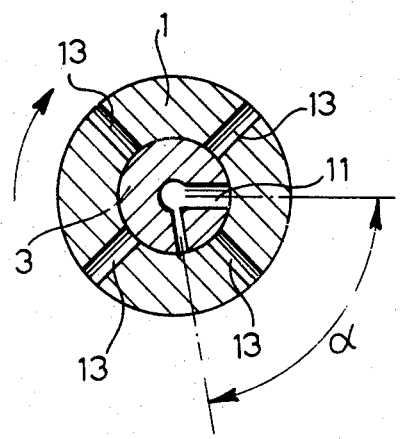
FIG. 11 is a cross-section corresponding to FIG. 9 of a varient of the second embodiment.

Also for this pump the value of the angle $\alpha$ by which the outlet ends of the ducts 11, 12 are separated is close to 180°, as illustrated in FIGS. 7 and 9, or is close to 90°, as illustrated in FIG. 11, according to whether the engine to be fed by the pump is of the direct injection type or of the precombustion chamber type.

Figure 8:
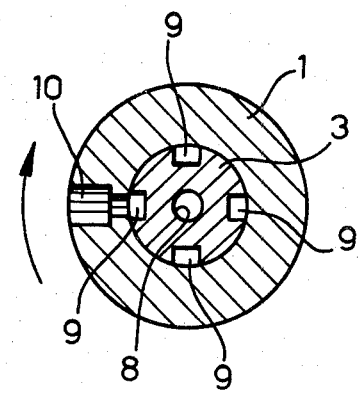
FIG. 8 is a cross-section taken on line VIII—VIII of FIG. 7.

In the pump illustrated in FIGS. 7 to 9 the ducts 9 are formed in the end of the distributor member 3 within the pump body 1 and enter intermittently into communication with the fuel supply duct 10 to deliver fuel to the compression chamber 5a. The ducts 9 comprise angularly equidistantly spaced longitudinal channels which communicate with a compression chamber 5a within the bore 2 closed by the inner end of the distributor member 3.

The operation of the fuel injector pump of FIG. 7 is as follows: for a certain value of the speed of rotation of the engine and therefore for a certain value of the rotational speed of the distributor member 3, fuel is fed intermittently through the ducts 10 and to the compression chamber 5a. When the ducts 9 and 10 are out of communication with each other the distributor member 3 is displaced upwards, by the effect of the engagement of the cam 14 with the roller 15 during the rotation of the distributor member 3, causing fuel to be fed through the ducts 11 and 12 and the delivery ports 13 into two different cylinders, to effect respectively the principal injection in one cylinder and the preinjection in the other cylinder.

Upon variation of the rotational speed of the engine, the action of the pump differs according to whether it is used on an engine of the direct injection type or of the precombustion chamber type.

Figure 10:
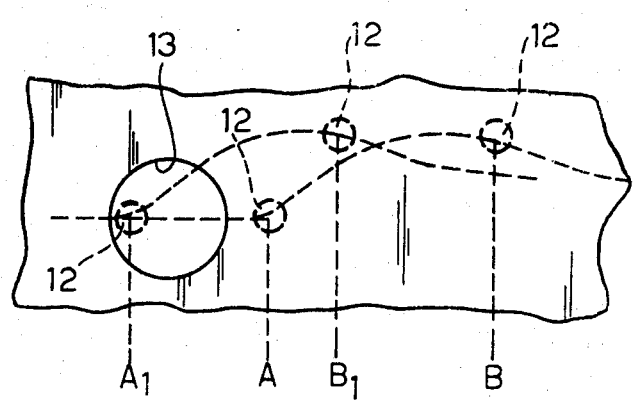
FIG. 10 illustrates diagrammatically a detail of the pump of FIG. 7 in one specific working condition.

FIG. 10 illustrates, in developed plan, the relative positions of one of the delivery ports 13 and the outlet end of the duct 12, at the beginning A and at the end B respectively of the delivery stroke of the member 3 at different engine rotational speeds, in the case of the direct injection type engine. The operation is in this case analogous to that described with reference to FIG. 4, with the difference that now, because of the reciprocating movement of the distributor member 3, the trajectory of the outlet end of the duct 12 is not rectilinear, but curvilinear, as indicated by a broken line in FIG. 10.

Figure 12:
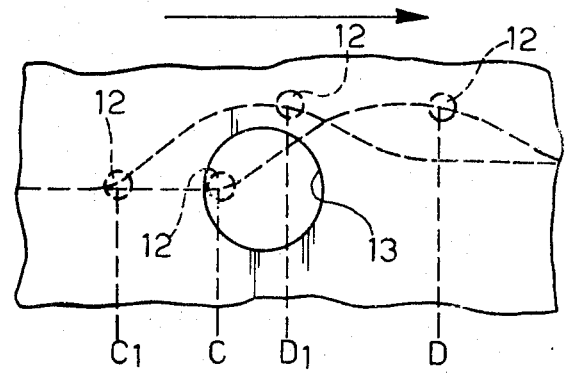
FIG. 12 is a diagrammatic illustration corresponding to FIG. 10 of a variant of the second embodiment.

FIG. 12 illustrates the variant of FIG. 10 corresponding to the case in which the engine intended fed by the pump is of the precombustion chamber type. In this case the operation of the pump is analogous to that described with reference to FIG. 6, the sole difference being that the trajectory described by the outlet end of the duct 12 is curvilinear rather than rectilinear.

Tests carried out on an injector pump of the type illustrated in FIG. 7 based on a Bosch pump of the EP/VE type, having a distributor member 3 of 9 mm diameter, delivery ports 13 of 2.2 mm diameter, and a duct 12 having a diameter of 0.6 mm, have established the following optimum values of the angle $\alpha$ for a four-cylinder engine having a total cylinder capacity of 2500 cm$^3$, of the two types referred to:

Precombustion chamber engine: $\alpha = 77°$
Direct injection engine: $\alpha = 193°$ It will be understood that details of construction and practical embodiments may be varied widely with respect to what has been described and illustrated purely by way of example, without departing from the scope of the invention.

We claim:

1. A fuel injection pump for a multi-cylinder compression-ignition internal combustion engine of the direct-injection type, said pump comprising:

a pump body having an internal cylindrical cavity and a compression chamber, means for the introduction of fuel in the said compression chamber, piston means slidable within the body for compressing fuel in the said compression chamber, means defining a number of delivery apertures in the wall of the cylindrical cavity of the body for communication with each of the cylinders of the engine, a rotary distributor member located in the said cylindrical cavity, said distributor member being rotatable by drive transmitted from the engine in use of the pump to effect one complete revolution in said cavity in each cycle of the engine, two distinct fuel passage means, formed in said rotary distributor member and each having an inlet end permanently communicating with the compression chamber and an outlet end in the external surface of the distributor member, the outlet ends of the said passage means being situated in two areas angularly separated from each other such that they come intermittently into communication, upon rotation of the distributor member, with successive said apertures to effect, in correspondence with each fuel delivery stroke of the said piston means, two injections of fuel into two different cylinders of the engine, so that the pump delivers to each cylinder of the engine in each cycle thereof a principal injection of fuel substantially at the end of the compression stroke in said cylinder, preceded by a pre-injection of fuel, means sensitive to the engine rotational speed for advancing the start of the delivery stroke of the piston means upon increase in the engine rotational speed, wherein the angle between the outlet ends of the said two fuel passage means is such that when the engine rotational speed is lower than a threshold value substantially equal to half the maximum speed of rotation of the engine, only one of said two fuel passage means communicates with one of said delivery apertures during each fuel delivery stroke of said piston means, whereby only the principal injection is delivered to each cylinder of the engine in each cycle thereof when the rotational speed of the engine is lower than said threshold value.

* * * * *